Patented July 9, 1940

2,207,482

UNITED STATES PATENT OFFICE 2,207,482

INSECTICIDE, FUNGICIDE, AND GERMICIDE

Roy H. Ellis, Orlando, Fla.

No Drawing. Application October 26, 1937,
Serial No. 171,137

4 Claims. (Cl. 167—14)

This invention relates to insecticides, fungicides, and germicides, and more particularly to compositions of this type which are adapted to be used in connection with the propagation of plant life.

The general object of the invention is to provide a novel and improved composition which will be safe and effective when used for the purpose described.

A more particular object of the invention is the provision of a composition of this character from which the active insecticidal, fungicidal, and germicidal principles are for the most part liberated gradually after application of the composition to the plant or to the soil.

A further object is to provide such a composition which has, in addition to the insecticidal, fungicidal and germicidal properties mentioned, a definite nutritive function, supplying to the plant elements necessary to its growth and development, certain of which are liberated gradually and after application of the compound, as in the case of the elements which exert the control over the injurious and parasitic life which may attack the plant.

In its preferred form, the invention contemplates the provision, in the dry pulverulent state, of a composition comprising essentially barium sulfide and a nicotine containing material, such as pulverized tobacco leaves or stems. The invention also includes the provision of an additional component containing nitrogen, which may comprise almost any organic matter such as natural or barnyard manures or compost.

It has long been known that barium sulfide, in the presence of moisture, will yield barium hydroxide and barium sulf-hydrate in accordance with the formula:

$$2BaS + 2H_2O = Ba(OH)_2 + Ba(SH)_2$$

and this known reaction has been made use of in prior proposals looking toward the preparation of certain insecticides or germicides, the barium sulfide having been mixed with lime and the resulting product applied to the plants or soil.

However, I have found that the products resulting from the reaction between the barium sulfide and water are not only useful to some extent in themselves but, what is more important, serve as most effective liberators for the nicotine in the tobacco and for the ammonia in both the tobacco and the other organic matter which I propose to use. These reactions are also accompanied by the setting free of a certain amount of hydrogen sulfide, which is a most potent fungicidal agent. Thus it will be apparent that I have provided a novel composition the component parts of which react among themselves to form products which not only exert germicidal, fungicidal and insecticidal functions but also those which provide nutriment and stimulate plant growth.

Furthermore, by preparing and marketing the composition in the dry state and in a pulverulent form, and depending upon the gradual absorption of the natural moisture of the air or the soil to initiate and further the reactions, the length of time of the liberation of the effective elements may be prolonged and thus greatly increase the effectiveness of the product. Also, the degree of fineness of the ingredients may be varied in order to regulate the rate of chemical change and in fact, it has been found to be advantageous to have the materials going to make up a given quantity of the composition of several different degrees of fineness. This applies especially to the barium sulfide, the particles of which may be of anywhere from 50 mesh to 200 mesh in size.

Since the novel composition is not only to be used by applying it to or mixing it with the soil, but also by dusting it onto the foliage of the plants themselves, it is frequently desirable to include in the mixture a quantity of powdered phosphate rock. This material not only adds weight to the dusting composition to increase its adherence to the plants and to prevent it being blown away by the wind or otherwise scattered, but also increases the nutritive or fertilizing properties of the product. In this way, the phosphate exhibits advantages over the usual fillers such as bentonite, diatomaceous earth, and various clays.

It has been found that when all of the preferred ingredients of the composition are employed, in order to secure the complete effect of the various functions of both the original ingredients and the reaction products, the quantities of the materials used may be as follows:

| | Per cent |
|---|---|
| Barium sulfide | 5 to 20 |
| Pulverized tobacco | 25 to 75 |
| Phosphate rock | 5 to 20 |
| Organic matter | Balance |

One specific example of a composition which has proved very effective is as follows:

| | Per cent |
|---|---|
| Barium sulfide | 8 |
| Tobacco | 50 |
| Phosphate | 20 |
| Organic matter | 22 |

The mineral ingredients may be powdered in any suitable or conventional manner, and the tobacco and manures may be pulverized in a ball mill or similar apparatus.

Among the many pests both of insect and fungus varieties which the novel composition prepared in accordance with my invention is adapted to control, may be mentioned nematodes,—especially root knot nematodes,—ants, red spider, black spot, damp-off, anthracnose, etc. The composition, when applied to the soil in which seedlings are planted, promotes the development of fine root systems. When it is used in the soil in which young plants are potted, it has been found effective in some cases to remove the plants and the accompanying ball of earth from the pots and then dust the ball thoroughly with the composition and replace in the pot. This has been found particularly beneficial in the case of plants badly infested with nematodes. The composition has also been found useful in reducing the fungus which causes the foliage of the Gerbera to spot or turn brown. Bulb growers have found the composition especially beneficial when the bulbs are rolled in it before storing and before planting. The novel preparation also controls the rot which attacks Calla and Caladium plants at the surface of the ground late in the growing season. The composition will also eliminate nests of ants and effectively rid the garden of moles and salamanders. The composition has also been proved effective in controlling damp-off and pink rot in celery plants. Excellent results have also been observed in the use of the product in the control of leaf rollers in the growing of bean plants.

It will thus be understood that by means of the present invention, there has been provided an inexpensive, effective and safe insecticide, germicide, and fungicide which is absolutely non-injurious to plant life, will not burn or injure even tender seedlings when dusted upon them, and will effectively rid the garden of the injurious and parasitic pests which have been described.

Having thus described the invention, what is claimed as new and desired to be secured by Letters Patent is:

1. A dry, pulverulent insecticide, fungicide and germicide composition capable of being applied by dusting and comprising barium sulfide and tobacco, whereby upon application the barium sulfide gradually decomposes in the presence of natural or atmospheric moisture yielding barium sulf-hydrate and barium hydroxide, the decomposition product serving gradually to liberate nicotine from the tobacco.

2. A dry, pulverulent insecticide, fungicide, and germicide composition capable of being applied by dusting and comprising barium sulfide, pulverized tobacco, and manure, whereby upon application the barium sulfide gradually decomposes in the presence of natural or atmospheric moisture yielding barium sulf-hydrate and barium hydroxide, the decomposition product serving gradually to liberate nicotine from the tobacco and ammonia from both of the organic ingredients.

3. A dry, pulverulent insecticide, fungicide, and germicide composition capable of being applied by dusting and comprising barium sulfide, pulverized tobacco, natural manure, and phosphate rock; the ingredients being present within the following range of percentages: barium sulfide 5%–20%; pulverized tobacco 25%–75%; phosphate rock 5%–20%; and the natural manure making up the balance, whereby upon application the barium sulfide gradually decomposes in the presence of natural or atmospheric moisture yielding barium sulf-hydrate and barium hydroxide, the decomposition product serving gradually to liberate nicotine from the tobacco and ammonia from both of the organic ingredients.

4. A dry, pulverulent insecticide, fungicide, and germicide composition capable of being applied by dusting and comprising barium sulfide 8%; pulverized tobacco 50%; phosphate rock 20%; and other nitrogen-containing organic matter 22%, whereby upon application the barium sulfide gradually decomposes in the presence of natural or atmospheric moisture yielding barium sulf-hydrate and barium hydroxide, the decomposition product serving gradually to liberate nicotine from the tobacco and ammonia from both of the organic ingredients.

ROY H. ELLIS.